United States Patent [19]

Lundwall

[11] 4,028,841
[45] June 14, 1977

[54] DISTRIBUTION SYSTEM FOR VERMIN CONTROL COMPOSITION
[75] Inventor: Carl Lundwall, Maspeth, N.Y.
[73] Assignee: Lawrence Peska Associates, Inc., New York, N.Y. ; a part interest
[22] Filed: May 24, 1976
[21] Appl. No.: 689,567
[52] U.S. Cl. .................................................. 43/124
[51] Int. Cl.² ......................................... A01M 1/24
[58] Field of Search ..................................... 43/124
[56] References Cited
UNITED STATES PATENTS

| 2,862,765 | 12/1958 | Wing | 43/124 X |
| 2,981,025 | 4/1961 | Woodson | 43/124 |
| 3,614,841 | 10/1971 | Query | 43/124 |
| 3,676,949 | 7/1972 | Ramsey | 43/124 |

Primary Examiner—Louis G. Mancene
Assistant Examiner—Daniel J. Leach

[57] ABSTRACT

The present invention relates to a distribution system for a fluid vermin control composition comprising a pipe disposed in a building, the pipe having a plurality of openings therein and being connected to a reservoir and a pump which pumps a vermin control fluid through the pipe end and out of the openings therein. A timing device is also operatively connected to the distribution system for automatically and periodically delivering a fluid vermin control composition through the pipe system.

7 Claims, 1 Drawing Figure

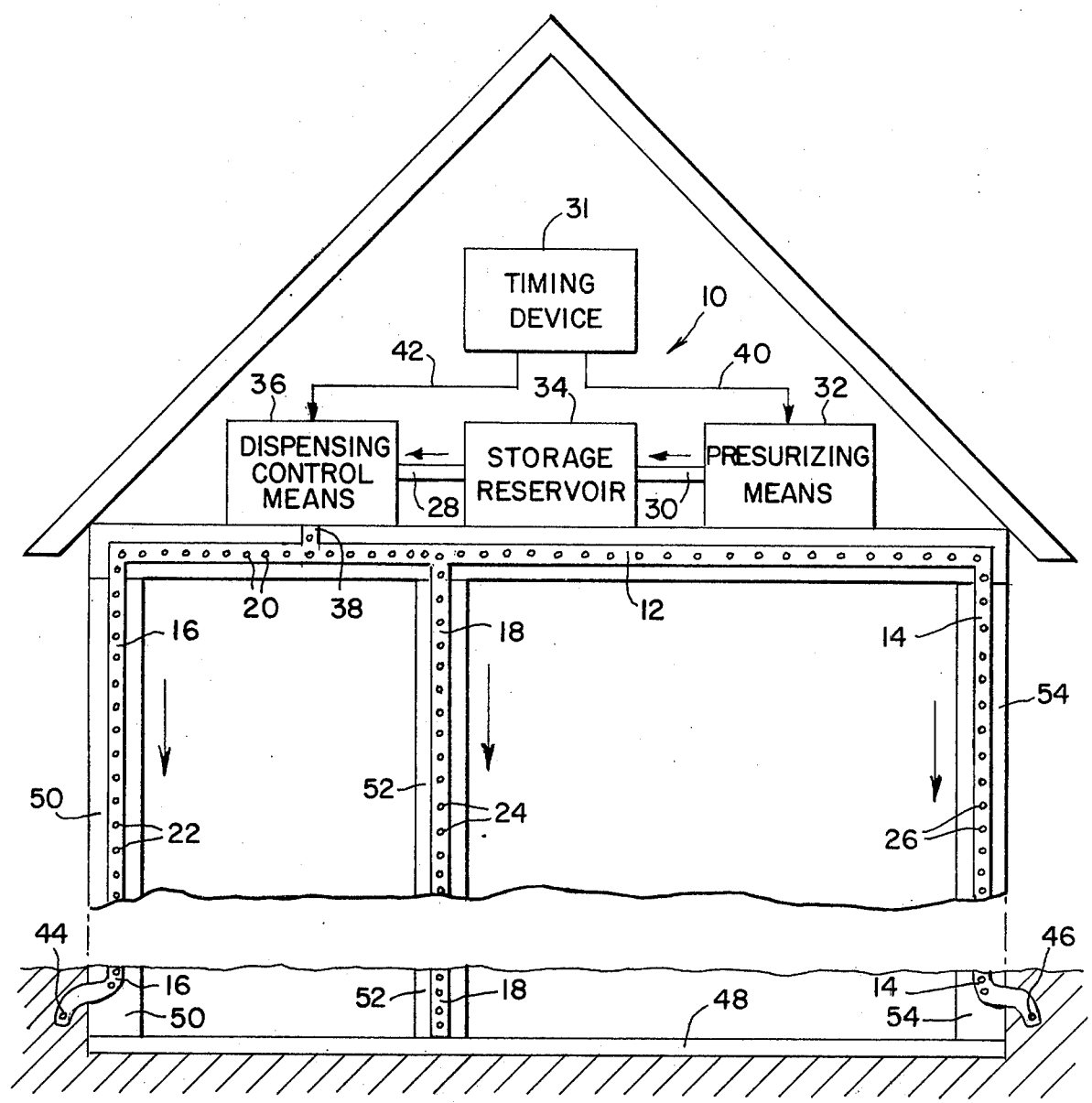

DISTRIBUTION SYSTEM FOR VERMIN CONTROL COMPOSITION

SUMMARY OF THE INVENTION

The present invention relates to a distribution system for a fluid vermin control composition comprising a pipe system disposed in a building by which it is meant the pipe system is both embedded in the ceiling and the walls of the building as well as being placed around the outer foundation of the building below ground level. The pipe is operatively connected to apparatus for automatically and periodically delivering a fluid vermin control composition through the pipe. Distribution members are provided in the pipe for releasing the fluid from the pipe.

The means for automatically and periodically delivering a fluid to the pipe in one embodiment comprises pressurizing apparatus operatively connected to a reservoir for containing a fluid vermin control composition, the pipe leading out of the reservoir. Automatic timing apparatus is operatively connected to the pressurizing apparatus turning the pressurizing apparatus off and on at measured time intervals.

In another embodiment, a dispensing control device is positioned intermediate the reservoir and the pipe and is operatively connected to the automatic timing apparatus for regulating the flow of a fluid vermin control composition from the reservoir to the pipe, when the automatic timing apparatus turns the pressurizing apparatus off and on.

The distribution apparatus in one embodiment comprises a plurality of discharge openings along the length of the pipe.

The pressurizing apparatus may comprise a pump whereas the dispensing control apparatus may comprise an automatic valve. In one embodiment, the pump comprises an electric pump whereas the automatic valve comprises a solenoid valve and the automatic timing apparatus comprises an automatic electric switch for automatically and periodically switching an electric current into the electric pump and the solenoid valve.

DETAILED DESCRIPTION

Vermin control apparatus disposed in a building is disclosed in the prior art U.S. Pat. Nos. 3,793,762 Stains; 3,602,248 Peacock; 3,513,586 Meyer, et al.; 3,676,949 Ramsey; 3,330,062 Carter; 3,209,485 Griffin; 3,151,746 Reustele, et al. and 2,981,025 Woodson.

The prior art discloses the dispensing of fluid vermin control compositions throughout buildings and along the outer wall below ground level by means of pipes; however, the applications of the vermin control composition although facilitated by the pipes disposed about and beneath the outer walls of buildings is not efficient, and in many instances excessive amounts of the vermin control composition are used in order to obtain a long lasting effect and to minimize the amount of time and labor in charging the system with a fluid vermin control composition and dispensing it throughout the distribution system. The use of large quantities of vermin control compositions although beneficial in minimizing or eliminating this type of pest from a building is attended by the hazards of having these compositions distributed in large quantities throughout the building within the inner walls and below ground level around the outer wall of the building. Any breaks or fissures in the walls allows some of the composition to seep through thereby increasing the hazard of exposure if the compound used is toxic. Additionally, foundation work on a completely constructed building might require excavation which in turn could expose workers to extraordinarily high quantities of these compositions which would be hazardous if the compounds used are toxic.

It is therefore an object of the present invention to overcome these and other difficulties encountered in the prior art.

It is a further object of the present invention to provide a distribution system for a fluid vermin control composition in a manner to avoid the hazard of large amounts of harmful materials at any one time applied to an area to be treated.

It is a further object of the present invention to provide a distribution system for a fluid vermin control composition whereby the repellant or toxic level of the compound may be maintained substantially at a control level without having to exceed such limits by using extraordinarily high levels of these compounds as is the case in the prior art one dose application treating methods to obtain long lasting effects of these compounds.

It is a further object of the present invention to provide a distribution system for a fluid vermin control composition for buildings in areas of high heat and humidity such as tropical or semi-tropical regions of the United States and throughout the world.

These and other objects have been achieved according to the present invention and will become apparent from the disclosure and claims that follow as well as the appended drawing.

Throughout the specification and claims, the phrase "fluid vermin control composition" is employed by which it is intended that not only insect but also rodent control compositions are to be included within the meaning of this expression and further the term "control composition" is to include not only compounds that kill or repel vermin but also compounds that are used to attract vermin into mechanical or electrical traps.

Referring to the drawing, a distribution system 10 for a fluid vermin control composition is illustrated comprising a pipe apparatus disposed in a building in which a pipe 12 having branch pipes 14, 16 and 18 leading off of pipe 12 downward through the walls 54, 50 and 52, respectively, are illustrated. Branch pipes 14, 16 and 18 have openings 26, 24 and 22 therein, pipes 16 and 14 terminating below ground level in openings 44 and 46, the openings in the pipes being provided to distribute a fluid vermin control system throughout the walls and below ground level of the building in which the pipes are disposed. A pressurizing means is provided such as a pump 32 and especially an electric pump for developing fluid pressure on a fluid vermin control composition maintained in storage reservoir 34, pressurizing means 32 being operatively connected to storage reservoir 34 by a fluid conduit 30, storage reservoir 34 in turn being connected to a dispensing control member 36 by means of a fluid conduit 28. The dispensing control member 36 may comprise a valve and especially an electric valve such as a solenoid valve; a timing device 31 is provided for automatically and periodically activating the pressurizing member or pump 32 to place the fluid vermin control composition in storage reservoir 34 under pressure and to automatically open and close the dispensing control means or solenoid valve 36. In one embodiment, the timer 31 comprises an automatic electric switch for automatically and periodically switching an electric current into the electric pump 32 and the solenoid valve 36 for the release of a fluid vermin control composition from reservoir 34 into the various pipes 12, 14 and 16 and for release through the openings 20, 22, 24 and 26 as well as subterranean openings 44 and 46. A cellar floor 48 supports the various walls 50, 52 and 54 and is positioned below ground level.

In use, the storage reservoir is charged with a vermin control composition such as chlordane and the timing device 31 is set so that the chlordane is periodically released through the various pipes and openings in order to control vermin such as termites and the like. Additionally, rodenticides as well as insecticides other than chlordane may be employed in the storage reservoir for treating the building.

Although the invention has been described by reference to some embodiments, it is not intended that the novel distribution system for a fluid vermin control composition be limited thereby, but that modifications thereof are intended to be included as falling within the broad scope and spirit of the foregoing disclosure, the following claims and the appended drawing.

What is claimed is:

1. A distribution system for a fluid vermin control composition comprising pipe means disposed in a building, said pipe means operatively connected to means for automatically and periodically delivering a fluid vermim control composition through said pipe means, means in said pipe means for releasing said fluid from said pipe means.

2. The distribution system according to claim 1 where said means for automatically and periodically delivering a fluid to said pipe means comprises pressurizing means operatively connected to reservoir means for containing said fluid vermin control composition, said pipe means leading out of said reservoir, automatic timing means operatively connected to said pressurizing means for turning said pressurizing means off and on automatically at regular intervals.

3. The distribution system of claim 2 further comprising dispensing control means intermediate said reservoir means and said pipe means and operatively connected to said automatic timing means for regulating the flow of fluid vermin control composition from said reservoir means to said pipe means when said automatic timing means turns said pressurizing means off and on.

4. The distribution system of claim 1 where said means for releasing fluid comprises a plurality of discharge openings along the length of said pipe.

5. The distribution system of claim 3 where said pressurizing means comprises pump means.

6. The distribution system of claim 5 where said dispensing control means comprises automatic valve means.

7. The distribution system of claim 6 where said pump means comprises electrical pump means, said automatic valve means comprises solenoid valve means, said automatic timing means comprises automatic electric switch means for automatically and periodically switching an electric current into said electric pump means and said solenoid valve means.

* * * * *